H. J. HERT.
AIR PURIFIER.
APPLICATION FILED MAR. 16, 1914.

1,182,089.

Patented May 9, 1916.

WITNESSES:
A. H. Edgerton
O. M. McLaughlin

INVENTOR
HENRY J. HERT.

BY
V. H. Lockwood
ATTORNEY

UNITED STATES PATENT OFFICE.

HENRY J. HERT, OF INDIANAPOLIS, INDIANA.

AIR-PURIFIER.

1,182,089.  Specification of Letters Patent.  Patented May 9, 1916.

Application filed March 16, 1914. Serial No. 825,147.

*To all whom it may concern:*

Be it known that I, HENRY J. HERT, a citizen of the United States, and a resident of Indianapolis, county of Marion, and State of Indiana, have invented a certain new and useful Air-Purifier; and I do hereby declare that the following is a full, clear, and exact description thereof, reference being had to the accompanying drawings, in which like letters refer to like parts.

The object of this invention is the prevention of oil, lubricating matter or other foreign substance from leaving an air pump.

The invention is made with particular reference for use in pumping air into pneumatic tires for vehicle wheels. If oil enters the pneumatic tire, it will injure the rubber.

One feature of the invention consists in providing a separator integral with the pump or pump cap so as to make a single unit.

Another feature of the invention is the provision of a relief valve in the lower part of the separator so as to get advantage of gravity in carrying out the oil and other foreign substance. Along with the foregoing is the yielding mounting of such relief valve so that when the pneumatic tire is pumped to a sufficient pressure, there will be a big pressure of the air which will automatically open the relief valve and not only relieve the pneumatic tire from further air admission, but will cleanse the separator or remove from it the accumulated oil as the same will be blown out through the relief valve.

The full nature of the invention will be understood from the accompanying drawings and the following description and claims.

Figure 1:
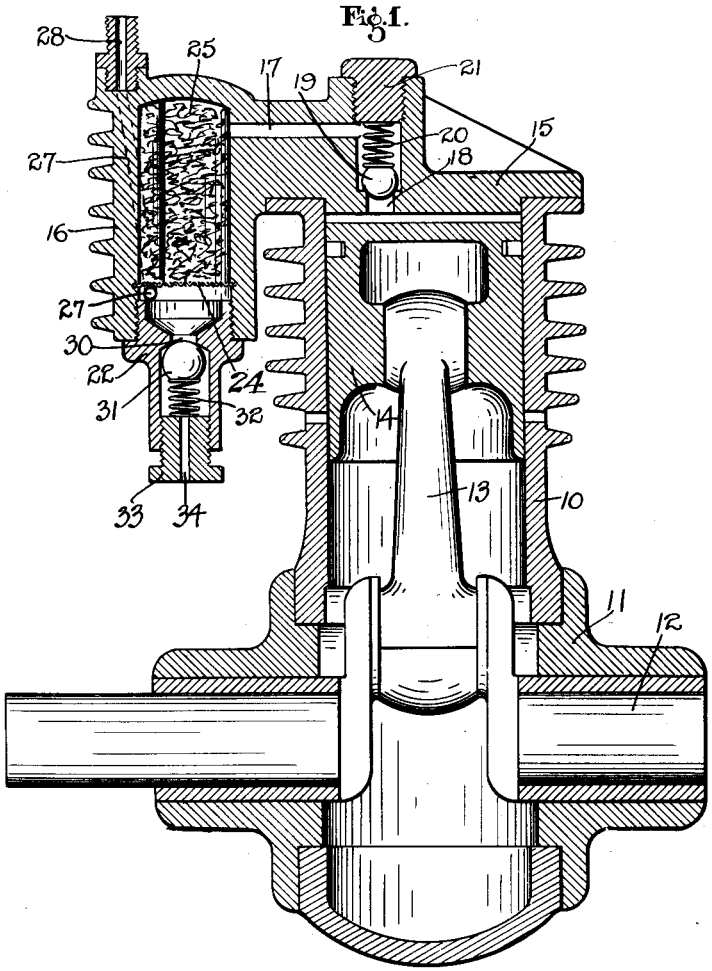
Figure 2:
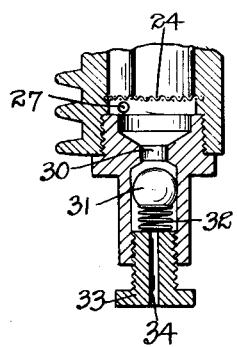

In the drawings, Figure 1 is a central vertical section through an air pump and separator, showing the parts in normal working condition. Fig. 2 shows the lower part of the separator with the relief valve open.

In the drawings there is shown an air pump having a cylinder 10, crank case 11, crank shaft 12, piston rod 13, piston 14 and cylinder cap 15. A separator or filter chamber 16 is secured to the pump cap 15, integral or otherwise, and a conduit 17 leads to the filter chamber 16 from a valve closed port 18 from the separator. Said port is closed by a ball valve 19 spring pressed by a spring 20 and the tension of the spring is controlled by a nut 21.

The filter chamber 16 is closed at its upper end and open and internally threaded at its lower end to receive a shouldered valve case 22 which screws into the lower part of the separator for considerable distance so as to form a chamber 23 covered over by a wire fabric or sieve 24 set in a groove in chamber 16 above said valve case, and the main body of the filter chamber 16 may be filled with filtering material 25. The air coming from the pump through passage 17 enters the upper end of the separator 16 and moves through the filtering material 25 and the wire sieve 24 to the chamber 23 and thence the air passes through a passageway 27 in the wall of the separator to a nozzle 28 on which a rubber tube, not shown, may be secured for conveying the air to the pneumatic tire or other place desired.

There is a port 30 in the bottom of the chamber 23 through which the oil and other substances which come down from the filtering material may escape from chamber 23. This port 30 is normally closed by a ball valve 31 which is held upward against its seat by a spring 32 upon a plug 33 which screws into the lower end of the valve case 22, and said plug 33 has an outlet conduit 34 through it. Therefore, when the air being supplied to the pneumatic tire, attains a sufficient degree of compression so that the air pressure in the chamber 23 will overcome the force of the spring 32 and open the valve 31, the further incoming air will force the oil and other liquids down through the port 30 and conduit 34. This action of the air will remove the oil which has accumulated in the lower part of the chamber 23 and it will also carry oil out of the filtering material down through chamber 23 and through the outlet referred to. Hence, the separator is well cleaned, and the cleaning occurs during the short period after the valve 31 has been opened by the back or excessive pressure of air upon the valve 31. When this valve opens, it makes sufficient noise to be heard and then the operator will know that the air in the tire is under sufficient pressure and will detach the device from the tire. The spring 32 can be adjusted to any desired tension by nut or plug 33, so that valve 31 will open at the proper time.

The invention claimed is:

1. In an air purifier, the combination of a separating chamber with an outlet opening for the separated material at the lower end thereof, means for producing a blast of air under pressure through said chamber, means within said chamber for separating the solids from the air as it passes therethrough, and a yieldingly mounted valve below said chamber for controlling the outlet opening, whereby said valve operates to control the extent of the pressure within such chamber and the outflow of the separated material from the chamber.

2. In an air purifier, the combination of a separating chamber with air inlet and outlet openings and an opening for the separated material below said air outlet opening, means for producing a blast of air under pressure through said chamber, means within said chamber for separating the foreign material from the air as it passes therethrough, and a yieldingly mounted valve below said chamber for controlling the opening for the separated material, whereby said valve operates to control the extent of the pressure within such chamber and the outflow of the separated material from the chamber.

3. In an air purifier, the combination of a vertically disposed separating chamber with an air inlet near its upper end and an air outlet above its lower end and an outlet for the separated material through the lower end thereof, means for producing a blast of air under pressure through said chamber, means within said chamber for separating the foreign material from the air as it passes therethrough, and a yieldingly mounted valve below said chamber for controlling the outlet opening, whereby said valve operates to control the extent of the pressure within such chamber and the outflow of the separated material from the chamber.

4. In an air purifier, the combination of a conduit, means for producing a flow of air under pressure therethrough, a separating chamber in said conduit having inlet and outlet openings in its walls communicating with the conduit, said separating chamber having a settling chamber formed therein with a third opening at the base of the settling chamber, and a yieldingly mounted valve adapted to normally close said last-mentioned opening, whereby said valve operates the control of the extent of pressure within said conduit and the outflow of the separated material from said settling chamber.

5. In an air purifier, the combination of a separating chamber with an outlet opening for the separated material at the lower end thereof, said chamber being adapted to permit the passage of a blast of air under pressure therethrough, means within said chamber for separating the foreign material from the air as it passes therethrough, and a yieldingly mounted valve below said chamber for controlling the outlet opening, whereby said valve operates to control the extent of the pressure within such chamber and the outflow of the separated material from the chamber.

6. In an air purifier, the combination of a separating chamber with air inlet and outlet openings and an opening for the separated material below said air outlet opening, said chamber being adapted to permit the passage of a blast of air under pressure therethrough, means within said chamber for separating the foreign material from the air as it passes therethrough, and a yieldingly mounted valve below said chamber for controlling the opening for the separated material whereby said valve operates to control the extent of the pressure within said chamber and the outflow of the separated material from the chamber.

7. In an air purifier, the combination of a conduit, a separating chamber in said conduit having inlet and outlet openings in its walls communicating with the conduit, said chamber being adapted to permit the passage of a blast of air under pressure therethrough, said separating chamber having a settling chamber formed therein with a third opening at the base of the settling chamber, and a yieldingly mounted valve adapted to normally close said last-mentioned opening, whereby said valve operates the control of the extent of pressure within said conduit and the outflow of the separated material from said settling chamber.

In witness whereof, I have hereunto affixed my signature in the presence of the witnesses herein named.

HENRY J. HERT.

Witnesses:
J. H. WELLS,
O. M. McLAUGHLIN.